(12) United States Patent
Leblanc et al.

(10) Patent No.: US 10,801,865 B2
(45) Date of Patent: Oct. 13, 2020

(54) FLUID ANALYSIS SYSTEM BASED ON INTEGRATED COMPUTING ELEMENT TECHNOLOGY AND FIBER BRAGG GRATING RADIOMETRY

(71) Applicant: HALLIBURTON ENERGY SERVICES, INC., Houston, TX (US)

(72) Inventors: Michel Joseph Leblanc, Houston, TX (US); David L. Perkins, The Woodlands, TX (US); Xinwei Lan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 130 days.

(21) Appl. No.: 16/068,089

(22) PCT Filed: Feb. 2, 2016

(86) PCT No.: PCT/US2016/016185
§ 371 (c)(1),
(2) Date: Jul. 3, 2018

(87) PCT Pub. No.: WO2017/135933
PCT Pub. Date: Aug. 10, 2017

(65) Prior Publication Data
US 2019/0195663 A1 Jun. 27, 2019

(51) Int. Cl.
*G02B 6/02* (2006.01)
*G01D 5/353* (2006.01)
(Continued)

(52) U.S. Cl.
CPC ......... *G01D 5/35316* (2013.01); *E21B 49/08* (2013.01); *G02B 6/02076* (2013.01); *G01N 21/31* (2013.01); *G02B 2006/12138* (2013.01)

(58) Field of Classification Search
CPC ............. G02B 6/02076; G02B 6/0208; G02B 2006/12138; G01D 5/35316; G01N 21/31
(Continued)

(56) References Cited

U.S. PATENT DOCUMENTS 8,823,939 B2 * 9/2014 Freese ................. G01N 21/17
356/433
2009/0129721 A1 * 5/2009 Chen ..................... G01F 23/292
385/12

(Continued)

FOREIGN PATENT DOCUMENTS

WO 2015073000 A1 5/2015

OTHER PUBLICATIONS

International Search Report and Written Opinion dated Oct. 12, 2016, International PCT Application No. PCT/US2016/016185.

*Primary Examiner* — Robert Tavlykaev
(74) *Attorney, Agent, or Firm* — McGuireWoods LLP

(57) ABSTRACT

A device for fluid analysis including an integrated computational element (ICE), a sample cell that optically interacts the ICE with a sample to generate a computation light associated with a characteristic of the sample, and a fiber sensor that receives the computation light and converts the computation light into a heat, is provided. The fiber sensor is coupled with a detector through an optical link, and is configured to return a portion of probe light through the optical link to the detector based on the heat converted. A method for using the device for performing fluid analysis is provided. A system for fluid analysis including at least one device as above is also provided.

25 Claims, 8 Drawing Sheets

(51) Int. Cl.
*E21B 49/08* (2006.01)
*G02B 6/12* (2006.01)
*G01N 21/31* (2006.01)

(58) Field of Classification Search
USPC .......................................................... 385/12
See application file for complete search history.

(56) References Cited

U.S. PATENT DOCUMENTS

| | | | |
|---|---|---|---|
| 2012/0150451 A1* | 6/2012 | Skinner | G01N 21/3577 |
| | | | 702/24 |
| 2012/0211650 A1* | 8/2012 | Jones | E21B 47/102 |
| | | | 250/269.1 |
| 2013/0014577 A1* | 1/2013 | Tam | G01P 5/10 |
| | | | 73/204.11 |
| 2013/0031972 A1 | 2/2013 | Freese et al. | |
| 2013/0287061 A1 | 10/2013 | Freese et al. | |
| 2014/0158876 A1 | 6/2014 | Jones et al. | |
| 2014/0191120 A1* | 7/2014 | Donderici | E21B 47/123 |
| | | | 250/265 |
| 2015/0015884 A1 | 1/2015 | Russell et al. | |
| 2015/0069996 A1* | 3/2015 | Imaoka | G01R 15/22 |
| | | | 324/96 |
| 2015/0300944 A1* | 10/2015 | Pelletier | E21B 49/08 |
| | | | 356/436 |

* cited by examiner

US 10,801,865 B2

FLUID ANALYSIS SYSTEM BASED ON INTEGRATED COMPUTING ELEMENT TECHNOLOGY AND FIBER BRAGG GRATING RADIOMETRY

BACKGROUND

In the field of oil and gas exploration and extraction, multiple measurements are performed near or at the bottom of a drilled wellbore. Currently, many applications perform data processing of the obtained measurements at or near the downhole measurement location, which requires the processed values to be subsequently transmitted up hole by various telemetry means, such as acoustic or electromagnetic telemetry. While these approaches may reduce the cost of signal transfer mechanisms and logistics, they are highly susceptible to environmental conditions, noise, interference, and are typically slow as the bandwidth of the electrical or acoustical channels is limited.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

In the figures, elements or steps having the same or similar reference numerals have the same or similar description and configuration, unless stated otherwise.

DETAILED DESCRIPTION

Figure 1:
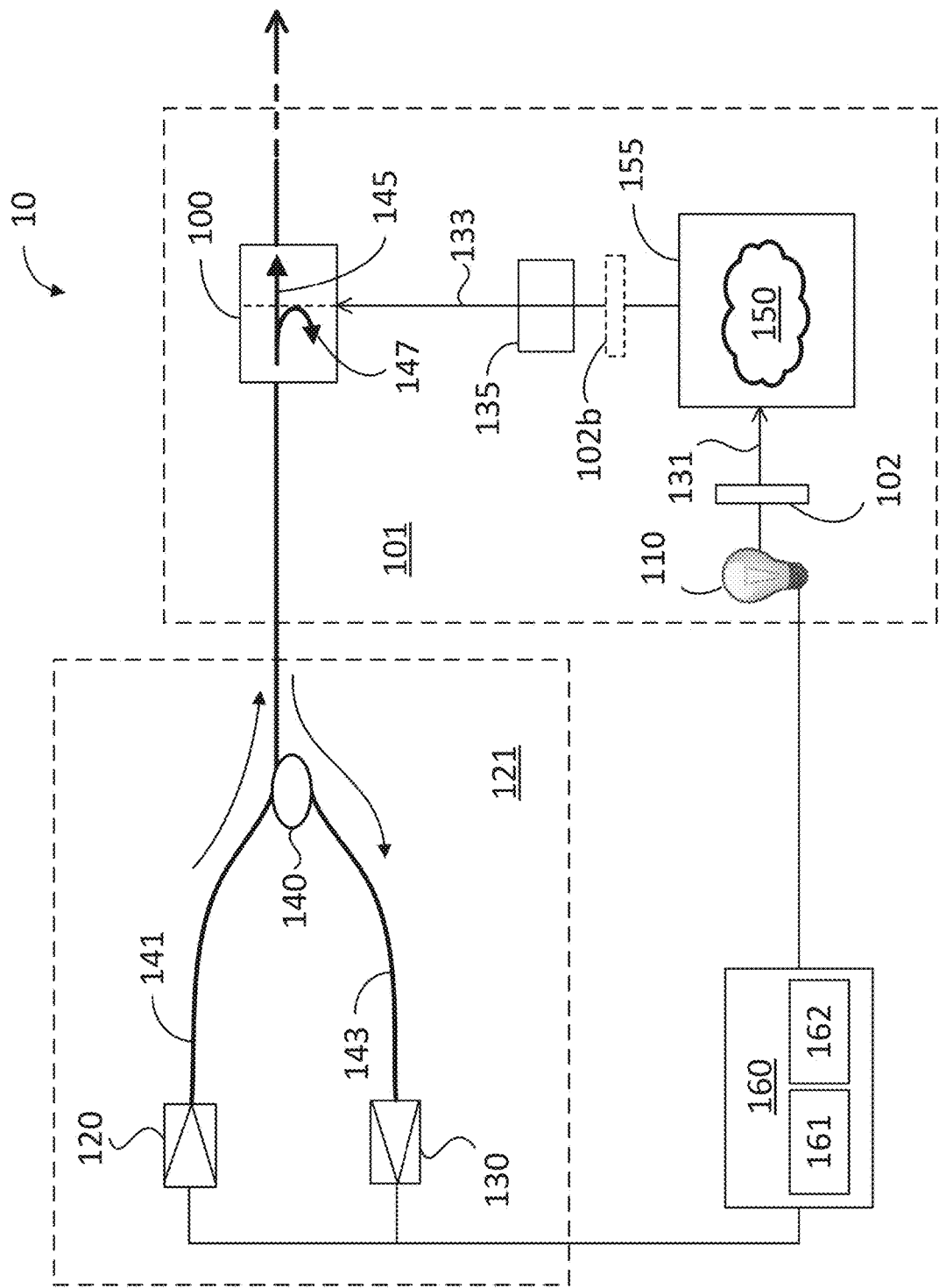
FIG. 1 illustrates a fluid analysis system including an optical computing device and a fiber sensor for remote measurement of a characteristic of a sample.

The present disclosure relates to using integrated computational elements (ICE) and a fiber sensor having a fiber Bragg grating (FBG) radiometer for measuring a characteristic of a sample substance. More specifically, the present disclosure relates to optical computing devices that combine ICE technology with FBG radiometry to convey fluid analysis information retrieved from a wellbore or a pipeline in the oil and gas industry. In some embodiments, a fluid analysis system including a plurality of optical computing devices as disclosed herein is deployed at multiple locations along a wellbore or pipeline or a hydrocarbon delivery infrastructure (e.g., oil or natural gas delivery).

Optical computing devices as disclosed herein allow for new downhole sensing capabilities with the realization of an all-optical sensing system. Embodiments disclosed herein include fluid analysis systems having distributed and quasi-distributed sensor networks providing a continuous coverage in space and time. Fluid analysis systems as disclosed herein provide low loss signal transmission to surface controllers and data processing devices using optical telecommunication techniques. Accordingly, fluid analysis systems consistent with the present disclosure are capable of permanent deployment and are easily retrievable for re-deployment or maintenance, when desired. A fluid analysis system as disclosed herein substantially reduces the use of downhole electronics and provides a high speed data transmission line via a broadband optical link.

Optical computing devices, also commonly referred to as "opticoanalytical devices," can be used to analyze and monitor a substance in real time. Such optical computing devices will often employ an integrated computational element (ICE). An ICE as disclosed herein is an element that optically interacts with a substance to determine quantitative and/or qualitative values of one or more physical or chemical properties of the substance. The ICE may include multilayered interference elements designed to operate over a continuum of wavelengths in the electromagnetic spectrum from the ultraviolet (UV, approximately at 250-400 nm) to mid-infrared (MIR, approximately at 5-40 microns—$\mu m$—) ranges, or any sub-set of that region. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance or a sample of the substance. As used herein the term "sample" will refer to a portion or quantity of a substance of interest. A characteristic of the substance may include a quantitative or qualitative value of one or more chemical constituents or compounds present therein, or any physical property associated therewith. Such chemical constituents and compounds may be referred to herein as "analytes." Illustrative characteristics of a substance that can be monitored with optical computing devices described herein can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, infrared and near-infrared radiation, visible light, ultraviolet light, X-ray radiation and gamma ray radiation.

As used herein, the term "optical computing device" refers to an optical device that is configured to receive an input of electromagnetic radiation associated with a substance and produce an output of electromagnetic radiation from a processing element arranged within the optical computing device. The processing element may be, for example, an integrated computational element (ICE), also known as a multivariate optical element (MOE). The electromagnetic radiation that optically interacts with the processing element is readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through, or from one or more processing elements (i.e., ICE or MOE components) or a substance being analyzed by the processing elements. Accordingly, optically interacted light refers to electromagnetic radiation that has been reflected, transmitted, scattered, diffracted, or absorbed by, emitted, or re-radiated, for example, using a processing element, but may also apply to interaction with a substance.

In current wireline technology, thermopiles are used for the measurement of infrared radiation. A thermopile is a set of thermocouples connected in series and configured so that the same temperature gradient is seen by all the connected thermocouples and the output voltage is the sum of the contribution of each thermocouple. In a thermopile, the temperature gradient is obtained by providing a black (light absorbing) material where the radiation hits the sensor, and by surrounding the black material with low absorption and low thermal conductivity material. The high temperature junctions of the thermopile are located in the dark material, and the low temperature junctions in the surrounding, non-absorbing material. A thermopile has a constant (flat) response over a broad range of radiation wavelengths due to the efficiency of the black material to absorb the incident radiation and convert it into heat.

Embodiments as disclosed herein replace electrical detector devices (e.g., a thermopile) by combining an ICE with a fiber sensor to measure the computation light. Electrical detector devices typically produce weak electrical signal output (at the level of milli-Volts—mV—). Moreover, electronics circuits, amplifiers and physical cable are used to process such weak electrical signals. However, each of these electronic components introduces noise into the received signal at the surface, deteriorating measurement accuracy. The fiber sensors disclosed herein offer a robust configuration that substantially reduces the number of downhole electronic components and allows both permanent and retrievable downhole deployments. Furthermore, in some embodiments, the fiber sensors can be coupled with an optical link that provides distributed sensing capability.

Accordingly, an optical computing device as disclosed herein includes at least one ICE to form computation light that has an intensity proportional to a desired characteristic of a sample. A fiber sensor converts the computation light into a measureable optical signal through an intensity, a wavelength, a phase, a polarization, or any other characteristic of the computation light. An optical link (e.g., via optical fiber) conveys the optical signal to a remote detector (which may be several kilometers—Km—away) at the surface of the wellbore. A fiber sensor as disclosed herein may include fiber interferometers, fiber Bragg gratings (FBGs), long period fiber gratings, fiber resonators, or other configurations.

The advantages of using fiber sensors as disclosed herein include faster data rates, substantial reduction of electrical noise, and mitigating the need for associated downhole power supplies given the low power loss of optical telecommunication channels. Accordingly, most of the components used in the optical computing devices disclosed herein may be used at elevated temperatures (150° C. or more) and for longer periods, as compared to devices that rely on downhole electronic components (e.g., electronic components to process the voltage output of a thermopile). As will be appreciated, errors and signal-to-noise ratio (SNR) deterioration of electronic circuitry commonly occur at elevated wellbore temperatures or through assuming extreme environmental conditions endured by long hydrocarbon pipelines over time. Furthermore, embodiments consistent with the present disclosure allow for distributed sensor deployment using wavelength-division-multiplexing (WDM) capabilities of optical telecommunication schemes. For example, some embodiments enable the use of multiple sensors distributed along an oil or gas pipeline, a wellbore, or both.

In a first embodiment, a device includes an ICE, and a sample cell that optically interacts the ICE with a sample substance to generate computation light associated with a characteristic of the sample. Further, the device may include a fiber sensor that converts the computation light into heat (e.g., by light absorption of a sensitive coating on the surface of a fiber) which in turn causes a temperature change of the fiber sensor. The fiber sensor is coupled with a detector through an optical link and is configured to return a portion of probe light (traveling within the optical fiber and in some embodiments different from the computation light) through the optical link to the detector according to the magnitude of the heat converted.

In a second embodiment, a system includes a probe light source, a detector, and an optical link to transmit probe light generated by the probe light source. The system may further include an optical computing device having an ICE, a sample cell that optically interacts the ICE with a sample substance to generate computation light associated with a characteristic of the sample, and a fiber sensor that converts the computation light into heat. The fiber sensor may be coupled to a detector through an optical link, and configured to return a portion of the probe light through the optical link to the detector according to the heat converted.

In yet another embodiment, a method includes providing probe light to an optical waveguide coupled to an optical link and optically interacting illumination light with an ICE and a sample to generate computation light associated with a characteristic of a sample. The method may further include converting the computation light to heat generated by a coating applied to the fiber sensor. Further, the method may include reflecting a portion of the probe light according to the heat generated by the coating and determining a value for the characteristic of the sample based on the reflected portion of the probe light.

FIG. 1 illustrates a fluid analysis system 10 including an optical computing device 101 for remote measurement of a characteristic of a sample 150. Fluid analysis system 10 includes a probe light source 120 to generate probe light 145, a detector 130 to receive and measure reflected light 147, and a controller 160 to control the system. An optical link 141 optically couples probe light source 120 with an optical computing device 101. In some embodiments, optical link 141 comprises or otherwise includes one or more optical fibers. Optical link 141 may have a low loss coefficient in the telecommunications wavelength band of probe light 145.

Optical link 141 includes a coupler 140 and a return channel 143 configured to provide reflected light 147 to detector 130. In some embodiments, probe light source 120, detector 130, optical link 141, return channel 143 and coupler 140 are part of a single unit referred to as an interrogator 121. Optical computing device 101 includes an illumination source 110 to generate illumination light that optically interacts with an ICE 102 to generate modified light 131. Illumination source 110 may include a tungsten lamp, or any other source of broadband, near-infrared (NIR) electromagnetic radiation (i.e., spanning a wavelength range from about 800 nm to about 5 μm). In some embodiments, illumination source 110 may include other regions of the electromagnetic spectrum, such as the ultra-violet/visible region (UV-VIS, from about 250 nm to about 800 nm), or the mid-infrared region (from about 5 μm to about 40 μm). Further according to some embodiments, illumination source 110 may be pulsed 'on' and 'off' periodically, reducing power consumption and also enabling modulation detection techniques to improve signal-to-noise ratio (SNR) in the measurements.

Probe light source 120 may include a tunable light source (e.g. a tunable laser), or a broadband light source interacting with a tunable filter or sequentially with an array of narrow band filters. In some embodiments, interrogator 121 includes a tunable filter or an array of narrow band filters placed before detector 130. In some embodiments, probe light source 120 generates probe light 141 having a wavelength in a telecommunications wavelength band. A telecommunications wavelength band may be the O-band (approximately 1260 nm-1360 nm), the E-band (approximately 1360 nm-1460 nm), the S-band (approximately 1460 nm-1530 nm), the C-band (approximately 1530 nm-1565 nm), the L-band (approximately 1565 nm-1625 nm), or the U-band (approximately 1625 nm-1675 nm). Other wavelength bands in the near infrared (NIR) region may be used, depending on the specific configurations of fluid analysis system 10.

Controller 160 may include a processor 161 and a memory 162. In some embodiments, controller 160 is communicably coupled with probe light source 120, detector 130, and optical computing device 101. Accordingly, controller 160 may be configured to provide commands and signals to probe light source 120, illumination source 110, and detector 130, and receives signals and data from detector 130. In some embodiments, controller 160 provides a pulsing signal command to illumination source 110 to turn 'on' and 'off' at desired intervals. In some embodiments, processor 161 in controller 160 may be configured to receive, amplify and process data received from detector 130, and to store the processed data in memory 162. Accordingly, in some embodiments, processor 161 may be configured to perform analog and digital filtering techniques of a signal provided by detector 130 when illumination source 110 is pulsated with a selected modulation. In general, memory 162 includes commands that, when executed by processor 161, cause fluid analysis system 10 to perform steps in methods consistent with the present disclosure.

In some embodiments, optical computing device 101 includes a sample cell 155 and a fiber sensor 100. Sample cell 155 optically interacts modified light 131 with sample 150 to generate computation light 133 indicative of a characteristic of sample 150. Optical computing device 101 is configured to deliver computation light 133 to fiber sensor 100. Computation light 133 is the result of the optical interaction of modified light 131 and sample 150. Fiber sensor 100 receives computation light 133 and provides reflected light 147 when probe light 145 interacts with fiber sensor 100. In some embodiments, the center wavelength of reflected light 147 is based on a value of a certain property of computation light 133. Detector 130 receives and measures at least one property of reflected light 147. For example, in some embodiments, detector 130 measures an intensity, a center wavelength, a polarization, a phase, a time of arrival of a pulse of reflected light 147, or any combination thereof. Detector 130 may be a spectrometer configured to measure the optical spectrum of the reflected light 147.

Embodiments consistent with the present disclosure include optical elements 135 to collect computation light 133 from sample cell 155 and direct it to fiber sensor 100. Optical elements in optical computing device 101 convey the collected computation light 133 onto fiber sensor 100. For example, a parabolic mirror having fiber sensor 100 placed on its focal axis may increase the intensity of computation light 133 on fiber sensor 100. More generally, a number of different configurations could be used to achieve a desired collection efficiency of computation light 133 onto fiber sensor 100. In some embodiments, fiber sensor 100 can be surrounded by a capillary tubing transparent to infrared (IR) radiation in a wavelength range including computation light 133, but absorbing of IR radiation in a longer wavelength range. Accordingly, in some embodiments a capillary tubing creates a greenhouse effect around fiber sensor 100 wherein computation light 133 is allowed onto fiber sensor 100, while preventing any other radiation source from reaching the fiber sensor.

It should also be readily apparent to those skilled in the art that similar results may be obtained in embodiments where ICE 102b is placed so as to modify light from illumination source 110 after its interaction with sample 150. In embodiments where non-linear optical effects are negligible, placement of ICE 102 before light from illumination source 110 interacts with sample 150 or placing ICE 102b after light from illumination source 110 interacts with sample 150 is optional and produces substantially the same results. In embodiments where optical interaction with the sample involves fluorescence emission or Raman scattering, it may be desirable to use a configuration including ICE 102b. Accordingly, in fluorescence emission or Raman scattering it may be desirable to have ICE 102b modify the light from illumination source 110 after it has interacted with sample 150. Furthermore, while ICEs 102 and 102b are shown to be perpendicular to the direction of propagation of light, this configuration is not limiting. More generally, ICEs 102 and 102b may be configured to receive light at any desirable angle of incidence.

Optical computing device 101 is well suited to operate under harsh environmental downhole conditions given the resiliency of optical fiber components and the fact that light sources 110 are typically tungsten filaments configured to operate at high temperatures.

Figure 2:
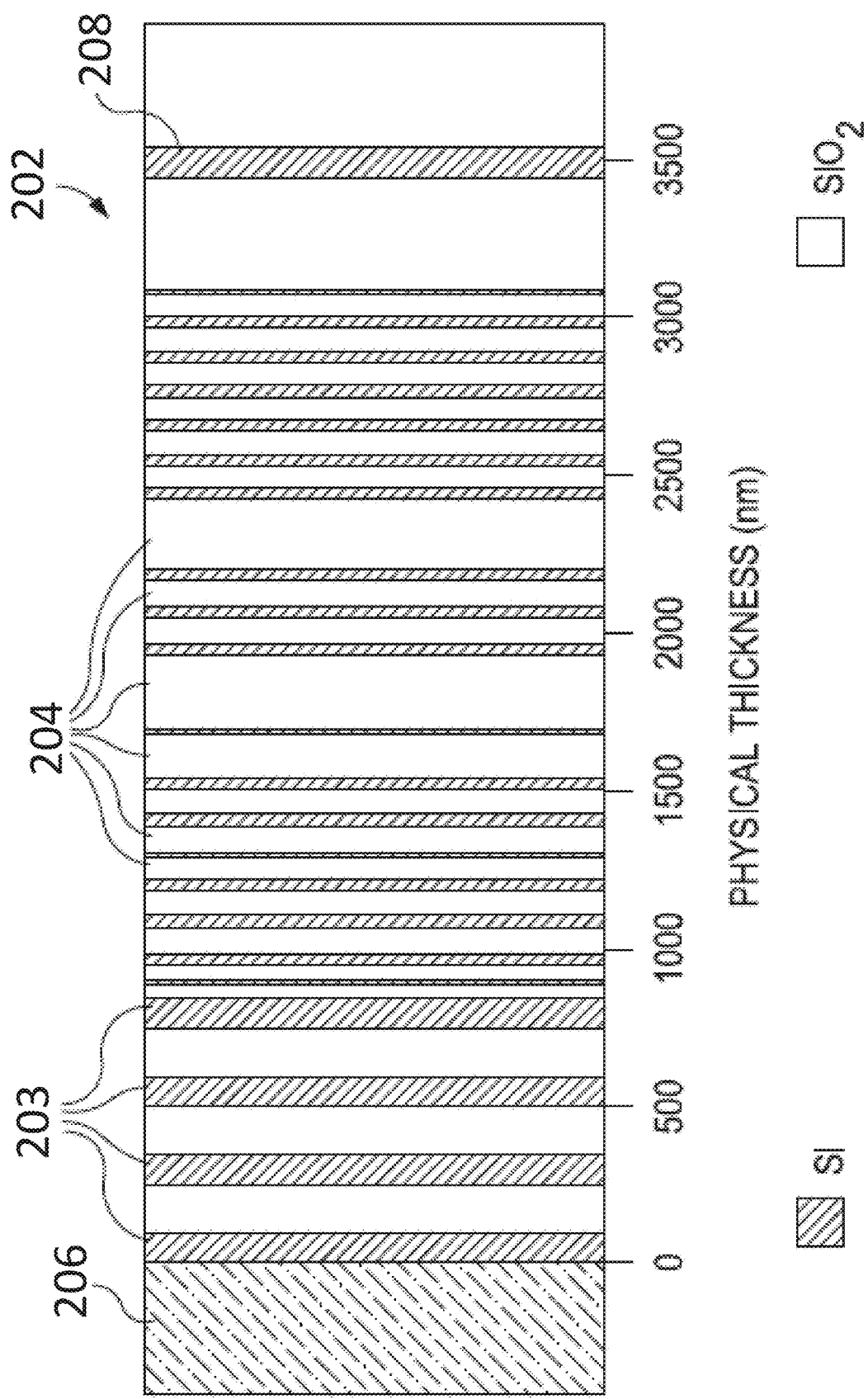
FIG. 2 illustrates a cross-sectional view of an exemplary integrated computational element (ICE).

FIG. 2 illustrates a cross-sectional view of an exemplary integrated computational element (ICE) 202. The ICE 202 may be similar to or the same as the ICE 102 of FIG. 2 and, therefore, may be used in optical computing device 101 of FIG. 1. As illustrated, ICE 202 may include a plurality of alternating layers 203 and 204, such as silicon (Si) and $SiO_2$ (quartz), respectively. In general, layers 203, and 204 include materials whose index of refraction is high and low, respectively. Other examples of materials for use in layers 203 and 204 might include niobia and niobium, germanium and germania, MgF, SiO, and other high and low index materials known in the art. Layers 203, 204 may be strategically deposited on an optical substrate 206. In some embodiments, the optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite the optical substrate 206 in FIG. 2), ICE 202 may include a layer 208 that is generally exposed to the environment of the device or installation, and may be able to detect a sample substance. The number of layers 203, 204 and the thickness of each layer 203, 204 are determined from the spectral attributes acquired from a spectroscopic analysis of a characteristic of the substance being analyzed using a conventional spectroscopic instrument. The spectrum of interest of a given characteristic typically includes any number of different wavelengths. Each of the layers of material 203 and 204 have a selected thickness so that a computation light emerging from an illumination light modified by ICE 202 and interacted with a sample has an intensity proportional to a characteristic of interest of the sample. In some embodiments, the characteristic of interest may be a gas-oil ratio (GOR), a methane content, an aromatics content, a saturates content, or a water content, where the sample is a hydrocarbon fluid. In some embodiments, the characteristic of the sample may include a phase of a component of a hydrocarbon fluid. For example, in some embodiments a first ICE 202 may be configured to determine an amount of methane in a gas phase (e.g., forming bubbles), and a second ICE 202 may be configured to determine an amount of methane dissolved in crude oil.

It should be understood that the exemplary ICE 202 in FIG. 2 does not in fact represent any particular characteristic of a given substance, but is provided for purposes of illustration only. Consequently, the number of layers 203, 204 and their relative thicknesses, as shown in FIG. 2, bear no correlation to any particular characteristic. Nor are the layers 203, 204 and their relative thicknesses necessarily drawn to scale, and therefore should not be considered limiting of the present disclosure. Moreover, those skilled in the art will readily recognize that the materials that make up each layer 203, 204 (i.e., Si and SiO$_2$) may vary, depending on the application, cost of materials, and/or applicability of the material to the given substance being analyzed.

In some embodiments, the material of each layer 203, 204 can be doped or two or more materials can be combined in a manner to achieve the desired optical characteristic. In addition to solids, the exemplary ICE 202 may also contain liquids and/or gases, optionally in combination with solids, in order to produce a desired optical characteristic. In the case of gases and liquids, the ICE 202 can contain a corresponding vessel (not shown), which houses the gases or liquids. Exemplary variations of ICE 202 may also include holographic optical elements, gratings, piezoelectric, light pipe, and/or acousto-optic elements, for example, that can create transmission, reflection, and/or absorptive properties of interest.

Layers 203, 204 exhibit different refractive indices. By properly selecting the materials of layers 203, 204 and their relative thickness and spacing, ICE 202 may be configured to selectively pass/reflect/refract predetermined fractions of electromagnetic radiation at different wavelengths. Each wavelength is given a predetermined weighting or loading factor. The thickness and spacing of layers 203, 204 may be determined using a variety of approximation methods from the spectrum of the characteristic or analyte of interest. These methods may include inverse Fourier transform (IFT) of the optical transmission spectrum and structuring the ICE 202 as the physical representation of the IFT. The approximations convert the IFT into a structure based on known materials with constant refractive indices.

The weightings that layers 203, 204 of ICE 202 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 202 performs the dot product of the electromagnetic radiation received by ICE 202 and the wavelength dependent transmission function of ICE 202. The wavelength dependent transmission function of the ICE 202 is dependent on the layer material refractive index, the number of layers 203, 204 and the layer thicknesses. The transmission function of ICE 202 is designed to mimic a desired regression vector derived from the solution to a linear multivariate problem targeting a specific component of the sample being analyzed. As a result, the output light intensity of ICE 202 is proportional a dot product of a transmission spectrum of the sample with the regression vector associated with the characteristic of interest. Accordingly, the output light intensity of ICE 202 is a direct indicator of a value of the characteristic of interest of the sample.

ICE 102 (FIG. 1) in optical computing device 101 (FIG. 1) is capable of extracting the information of the spectral fingerprint of multiple characteristics or analytes within a substance and converting that information into a detectable output regarding the overall properties of the substance. That is, through suitable configurations of optical computing device 101, electromagnetic radiation associated with characteristics or analytes of interest in sample 150 can be separated from electromagnetic radiation associated with all other components of the substance in order to estimate the properties of the substance in real-time or near real-time. Accordingly, ICE 102 is able to distinguish and process electromagnetic radiation related to a characteristic or analyte of interest.

Figure 3:
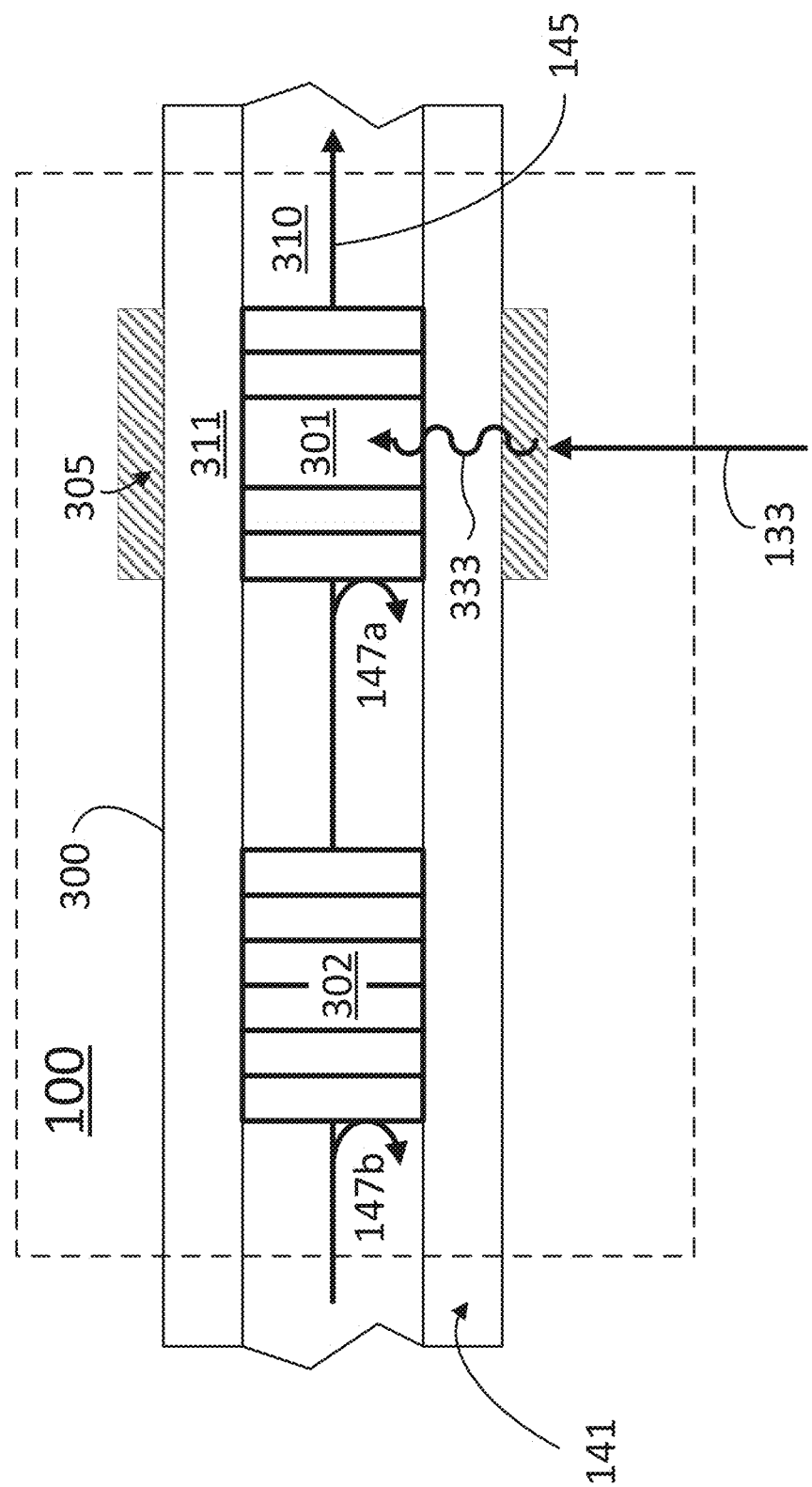
FIG. 3 illustrates a fiber sensor configured for fiber Bragg grating (FBG) radiometry.

FIG. 3 illustrates a schematic view of fiber sensor 100 configured for fiber Bragg grating (FBG) radiometry. Fiber sensor 100 includes a sensitized FBG 301 and a reference FBG 302. The fiber Bragg grating in each of sensitized FBG 301 and reference FBG 302 may include a periodic modulation of the index of refraction of a core 310 for a certain portion of a fiber 300. The index of refraction modulation is adjusted so that a specific wavelength of probe light 145 is returned through optical link 141 as reflected light 147. The length of the FBG portion, and the depth of the refractive index modulation determine the bandwidth of the FBG reflection spectrum around the center wavelength. A longer FBG portion and a small index modulation account for a narrower bandwidth of the reflected light. In some embodiments, the length of the FBG portion may be a few millimeters (e.g., 3 to 10 mm).

Sensitized FBG 301 provides a reflected portion 147a of probing light 145 and reference FBG 302 provides a reference reflected portion 147b of probing light 145. A center wavelength, $\lambda_C$, of reflected portion 147a or a center wavelength, $\lambda_R$, of reference reflected portion 147b is dependent on several factors including a temperature and an axial strain of fiber 300 (e.g., stretching of fiber 300 along the optical propagation direction). In general, a center wavelength, $\lambda_C$, of reflected portion 147a is not the same as a center wavelength, $\lambda_R$, of reference reflected portion 147b, and a natural wavelength separation may be defined as, $\Delta = \lambda_C - \lambda_R$.

Sensitized FBG 301 includes a sensitive coating 305 configured to absorb computation light 133. Sensitive coating 305 may include a thin film of an IR absorber (e.g., graphene ink) coated on the fiber 300. Sensitive coating 305 is thermally coupled with a cladding 311 and with core 310 of fiber 300. When computation light 133 impinges on sensitive coating 305, the intensity of computation light 133 is converted into heat 333, which propagates through cladding 311 and into core 310 in sensitized FBG 301. Heat 333 induces a rise in temperature, T, of core 310 in sensitized FBG 301, and consequently a shift in wavelength $\lambda_C$ relative to wavelength $\lambda_R$, assuming that little to none of heat 333 reaches reference FBG 302.

In some embodiments, reference FBG 302 is located near sensitized FBG 301 and therefore is subject to similar or the same environmental stresses and conditioning as sensitized FBG 301. Furthermore, in some embodiments it is desirable that $\lambda_C$ be approximately close to $\lambda_R$. For example, in some embodiments where the wavelength of probe light 145 is in the C-band of the NIR spectrum, $\lambda_R$ may be approximately 1550 nm and $\lambda_C$ may be approximately 1551 nm. Sensitized FBG 301 responds to computation light 133 and also to changes induced by environmental variations (such as surrounding temperature change, acoustics, vibration, and the like). It is desirable that, while reference FBG 302 is disposed near sensitized FBG 301, the configuration of fiber sensor 100 substantially avoids computation light 133 from impinging on reference FBG 302. Accordingly, it is desirable that reference FBG 302 only or mostly responds to changes induced by similar or the same environmental variations as sensitized FBG 301, and not to computation light 133.

Sensitive coating 305 may be selected from a plurality of coating materials having an absorption band that includes the bandwidth of computation light 133. Accordingly, it is desirable that the absorption of sensitive coating 305 be comparatively higher in a spectral range including the bandwidth of computation light 133. Graphene ink is an example material that may be used as sensitive coating 305 and that has a broad absorption band in the NIR region. In addition, graphene ink may prevent material contamination of fiber 300 by impurity absorption in downhole conditions. Any other materials with similar absorption properties may be suitable for use as sensitive coating 305, such as carbon black and other inks, and polymers and plastics that can be coated on fiber 300. Although not shown in FIG. 3, in some embodiments reference FBG 302 may also be coated with coating 305 so as to match as closely as possible the sensitivity to the environmental parameters (surrounding temperature, hydrogen gas traces, etc.) as sensitized FBG 301. Accordingly, in some embodiments reference FBG 302 is not exposed and therefore is not responsive to computation light 133 even when coated with coating 305.

In some embodiments, materials with specific light absorption band are also useful. For example, metamaterials and nanomaterials may be designed for specific high absorption peaks, and sensitive coating 305 may include a multi-layer structure with one or more of these materials, thus broadening the absorption band of the sensitive coating. Further, according to some embodiments, an algorithm may adjust the design of ICE 102 (FIG. 1) in conjunction with a specific coating material to improve selectivity and sensing resolution of fiber sensor 100. It is desirable that sensitive coating 305 have a thickness large enough to absorb a large portion of computation light 133. In some embodiments, it may also be desirable that sensitive coating 305 be thin enough so as not to add strain to fiber 300 and to transmit heat 333 to core 310 rapidly, without slowing the measurement speed due to a long heat transfer path to fiber core 311. In some embodiments, it is desirable for reference FBG 302 to be covered with the same coating 305 as is applied on FBG 301.

Sensitivity and SNR can be enhanced by special sensor configuration and packaging. For example, the size of fiber sensor 100 can be tailored by choosing different optical fibers. Different doping fibers can be tested and verified in terms of inherent optical properties, such as thermo-optic coefficients. The packaging scheme can also be designed and controlled to achieve a focusing effect to efficiently couple computation light 133 into fiber 300. In some embodiments, a focusing effect includes the use of lenses, concave mirrors (e.g., parabolic, cylindrical, and combinations thereof) as well as metal coatings and the like, in an optical arrangement between sample cell 155 (FIG. 1) and fiber sensor 100.

In one embodiment, a cylindrical metal piece enshrouds fiber 300 including reference FBG 302 and having a window facing sensitized FBG 301. While the cylindrical metal piece reflects computation light 133 off reference FBG 302, the window allows computation light 133 through to sensitized FBG 301 and beyond, where computation light 133 is reflected back to a portion of sensitized FBG 301 not facing the window. Further, such a cylindrical metal piece may hold both ends of fiber 300 and thereby bracketing sensitized FBG 301 and reference FBG 302 for strain relief along that portion of fiber 300 including sensitized FBG 301 and reference FBG 302. In some embodiments, an extra fiber length may be incorporated to provide strain relief for fiber sensor 100.

Instead of FBGs, fiber sensor 100 can incorporate other fiber sensor types, such as long period fiber gratings, extrinsic Fabry-Pérot interferometers (EFPI), or one or more fiber resonators (e.g., a Fabry-Perot resonator bound by two FBG's with a portion of sensitized fiber between the FBGs), and the like. Optical sensing parameters measured by fiber sensor 100 include intensity, wavelength, phase, polarization, or any optical parameter affected by a temperature change in a substrate of fiber 300. Accordingly, measurements made with such sensors may be comparable in response and used in the same way as done with FBGs, including the pairing with a reference sensor (such as done for sensitized FBG 301 and reference FBG 302).

Figure 4A:
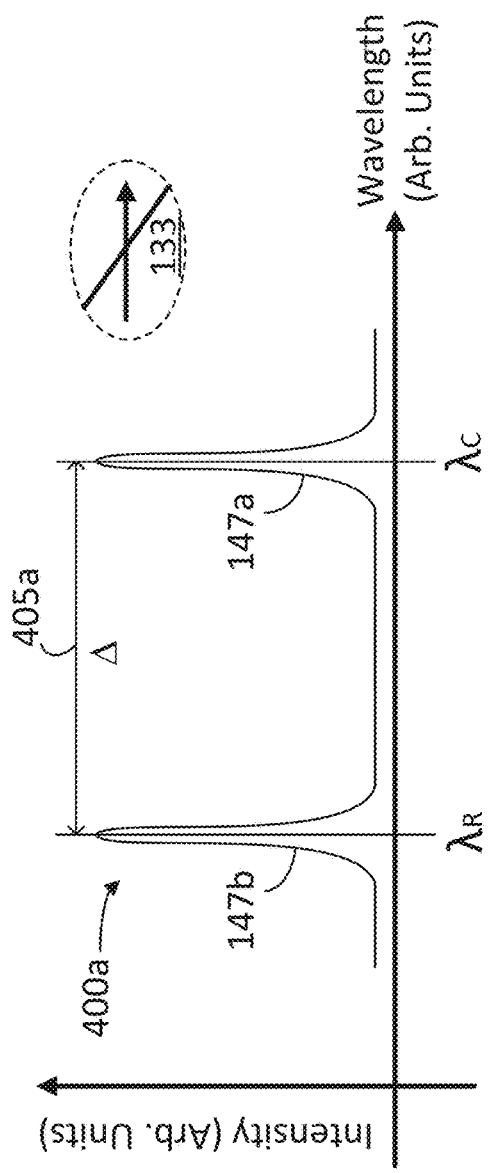
FIG. 4A illustrates a spectrum including a signal reflected from a reference FBG and a signal reflected from a sensitized FBG in the absence of modified light impinging on a fiber sensor.
Figure 4B:
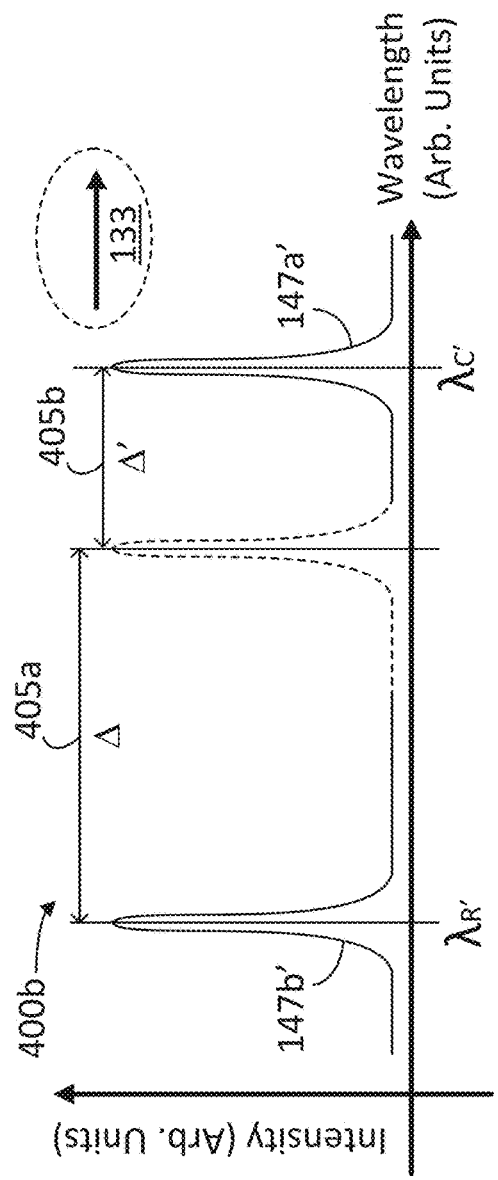
FIG. 4B illustrates a spectrum including a signal reflected from a reference FBG and a signal reflected from a sensitized FBG in the presence of modified light impinging on a fiber sensor.

FIGS. 4A and 4B illustrate spectral plots of reflected light 147 in an embodiment of a sensing mechanism that can be applied at fiber sensor 100 to detect heat 333 (cf. FIG. 3), namely: monitoring the wavelength shift of reflected portion 147a relative to reference reflected portion 147b. More particularly, FIG. 4A illustrates a spectrum 400a including reflected portion 147a from sensitized FBG 301 (FIG. 3) centered at wavelength $\lambda_C$ and reference reflected portion 147b centered at wavelength $\lambda_R$ from reference FBG 302 (FIG. 3), in the absence of computation light 133 impinging on fiber sensor 100. Note that, for illustrative purposes, it will be assumed that $\lambda_R < \lambda_C$. However, it is understood that a configuration with $\lambda_R > \lambda_C$ falls within the scope of embodiments consistent with the present disclosure. Natural wavelength separation 405a ($\Delta$) enables determining the behavior of each of sensitized and reference FBG 301, 302 independently. For example, in some embodiments natural wavelength separation 405a enables fluid analysis system 10 to monitor for absorption of impurities in the fiber and related effects such as 'darkening.' The darkening effect includes absorption of hydrogen impurities in the amorphous glass of the fiber induced at high pressure and temperature conditions (e.g., at the downhole or in extreme weather on a pipeline). Absorbed hydrogen ions create light-scattering centers that induce optical transmission loss and index of refraction changes that can alter the response of the FBGs.

FIG. 4B illustrates a spectrum 400b including a reflected portion 147a' from sensitized FBG 301 (FIG. 3) and a reference reflected portion 147b' from reference FBG 302 (FIG. 3) in the presence of computation light 133 (FIGS. 1 and 3) impinging on sensitized FBG 301. Reflected portion 147a' is centered at a wavelength, $\lambda_{C'}$, and reference reflected portion 147b' is centered at a wavelength, $\lambda_{R'}$. Accordingly, an induced wavelength shift 405b ($\Delta'=\lambda_{C'}-\lambda_{R'}-\Delta$) is added to natural wavelength separation 405a between wavelength $\lambda_{C'}$ and wavelength $\lambda_{R'}$. Induced wavelength shift 405b is the result of a spectral shift induced in sensitized FBG 301 by heat 333 (FIG. 3). Heat 333 generated by computation light 133 induces a change in the optical properties of sensitized FBG 301, which in turn alters the center wavelength $\lambda_{C'}$ of the reflected portion 147a'. The change in optical properties of sensitized FBG 301 may be a change in the index of refraction of the material for core 310 (FIG. 3) or for cladding 311 (FIG. 3) within sensitized FBG 301 induced by a temperature change or a stress change. The change in optical properties of sensitized FBG 301 may be produced by a change in the dimensions of sensitized FBG 301 induced by material expansion of core 310, thus a change in the grating period of FBG 301.

Tracing wavelength shift using fiber sensor 100 (FIGS. 1 and 3) to determine induced wavelength shift 405b, the ICE information can be acquired and analyzed. For example, a linear correlation may be calibrated for the value of induced wavelength shift 405b, with the intensity of computation light 133. Likewise, the intensity of computation light 133 may be associated with a value for the characteristic of the sample using ICE correlation techniques as described in detail above (cf. FIG. 2).

Sensitized and reference FBGs 301 and 302 can be used as temperature and strain sensors. Temperature and strain modify the effective index and period of grating, such that the resonance frequency, termed the Bragg wavelength, would shift accordingly. By specific packaging design, one or both of reference and sensitized FBGs 301 and 302 may only work as temperature sensor when no strain is applied. In such embodiments, induced wavelength shift 405b is attributed to a temperature change induced by heat 333. The value of $\lambda_R$ depends on surrounding (i.e. downhole) environmental temperature changes while the value of $\lambda_C$ depends on a property of computational light 133 in addition to the surrounding temperature variations. The measurement of the induced wavelength shift 405b provides a signal corresponding to the temperature rise in sensitized FBG 301 due to heat 333. In some embodiments, induced wavelength shift 405b may be linear related to the temperature change induced by heat 333. As a result, induced wavelength shift 405b can be processed to relate to the property of interest (e.g., fluid concentrations of different chemical species or physical properties) in the reservoir fluids. Reference FBG 302 compensates for interfering environmental signals and at the same time provides information about the value of the environmental signals. For example, reference FBG 302 may provide temperature variation information at the point of measurement due to environmental effects.

In some embodiments, induced wavelength shift 405b is measured remotely by detector 130 (FIG. 1), taking advantage of the ultra-low losses of optical fibers (e.g., approximately 0.2 dB/Km in the C-band). For example, in some embodiments detector 130 is located on the surface of an oil or gas well, several Km away from the downhole location of fiber sensor 100.

Figure 5:
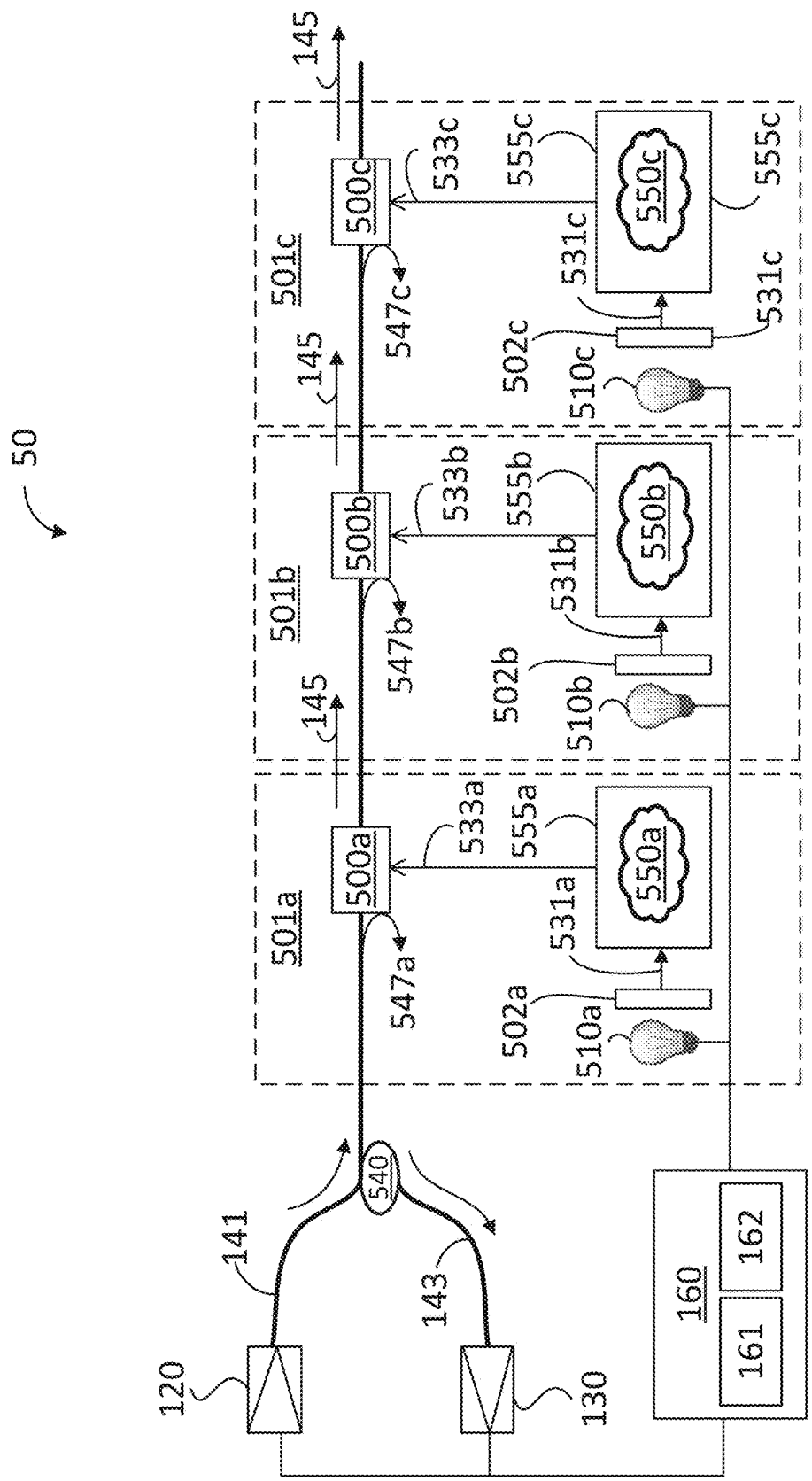
FIG. 5 illustrates a fluid analysis system including multiple optical computing devices coupled through an optical link.

FIG. 5 illustrates a fluid analysis system 50 including multiple optical computing devices 501a, 501b, and 501c (collectively referred hereinafter to as 'optical computing devices 501') coupled through optical link 141. Each optical computing device 501 may be similar to or the same as optical computing device 101 of FIG. 1 and located along distant measurement points in optical link 141. Accordingly, optical computing devices 500 include fiber sensors 500a, 500b, and 500c (hereinafter collectively referred to as 'fiber sensors 500') along a single optical cable in optical link 141. The optical cable in optical link 141 may include one or more optical fibers.

Fiber sensors 500 generate reflected lights 547a, 547b, and 547c (hereinafter referred to collectively as 'reflected lights 547') upon receiving computation lights 533a, 533b, and 533c (hereinafter collectively referred to as 'computation lights 533'), respectively. Similar to optical computing device 101 of FIG. 1, computation lights 533 are generated upon interacting modified lights 531a, 531b, and 531c with samples 550a, 550b, and 550c in sample cells 555a, 555b, and 555c, respectively. Hereinafter, modified lights 531a, 531b, and 531c will be referred to collectively as 'modified lights 531'; samples 550a, 550b, and 550c will be referred to collectively as 'samples 550'; and sample cells 555a, 555b, and 555c will be referred to collectively as 'sample cells 555'. Moreover, similar to optical computing device 101, modified lights 531 are generated by interacting a light from illumination sources 510a, 510b, and 510c (collectively referred to hereinafter as 'illumination sources 510') with ICEs 502a, 502b, and 502c (collectively referred to hereinafter as 'ICEs 502'), respectively.

In some embodiments, different wavelengths for reflecting lights 547 fall within the same NIR telecommunications band that includes probe light 145. For example, the different wavelengths of reflected lights 547 may span all or a portion of the C-band starting at $\lambda_a \sim 1550$ nm and be spectrally spaced by about 5 nm of each other (e.g., $\lambda_b \sim 1555$ nm, $\lambda_c \sim 1560$ nm, and so on). Note that each of reflected lights 547 from one of fiber sensors 500 may include a reference reflected light from a reference FBG in fiber sensor 500 and a sensitized reflected light from a sensitized FBG in fiber sensor 500. The reference reflected light and the sensitized reflected light may be separated by a natural wavelength shift $\Delta_a$, $\Delta_b$, and $\Delta_c$ from fiber sensors 500a, 500b, and 500c, respectively of about 1 nm or less (cf. FIGS. 1, 3 and 4). Accordingly, modified lights 533 induce a new wavelength shift $\Delta'_a$, $\Delta'_b$, and $\Delta'_c$ in each of fiber sensors 500a, 500b, and 500c, respectively.

Reflected lights 547 may be directed by coupler 540 into return channel 143 to be received and detected using known multiplexing methods in detector 130. Each of reflected lights 547 provides information about a desired characteristic of samples 550a, 550b, and 550c, respectively. Samples 550 may be sample portions of a hydrocarbon fluid at different points in a wellbore, for example, or at different points along a pipeline. Accordingly, the desired characteristic may be the same for all sample portions 550. In that regard, illumination sources 510 may all be similar, or the same, and likewise with respect to each ICE 502. Furthermore, in some embodiments some or all of optical computing devices 501 may share an illumination source 510 and/or an ICE 502. In some embodiments, the desired characteristic may be different for at least two optical computing devices 501. Furthermore, in some embodiments the nature of samples 550 may vary for at least two optical computing devices 501. Accordingly, in some configurations at least two of ICEs 502 may differ from each other because they are designed to target different characteristics, or they may be designed to target different sample types (e.g., heavy crude oil, light crude oil, natural gas, and the like).

While the nature and characteristics of illumination sources 510 and ICEs 502 are determined by the desired characteristic and the nature of the sample being analyzed, the wavelength and spectral content of probe light 145 and of reflected lights 547 may be selected from a wide range of choices according to a telecommunications convenience. In some embodiments, it may be desirable that the center wavelengths of reflected light 547a, 547b, and 547b be different from each other, in order to increase the information capacity of optical link 141. In that regard, probe light source 120 may be configured to generate probe light 145 having a spectrum with a bandwidth that includes the center wavelengths of reflected lights 547a, 547b, and 547c. In some embodiments, other multiplexing techniques may be used to increase the information capacity of optical link 141, such as time-division multiplexing. In that regard, probe light source 120 may be configured as a pulsed light source (e.g., a pulsed laser), or a continuous light source (e.g., a continuous laser). Accordingly, each of reflected lights 547a, 547b, and 547b may be received by detector 130 at a different time, indicating its location along optical link 141 by the travel time it takes to arrive at detector 130.

In some embodiments, optical computing devices 501 may share one or more of probe light source 120, detector 130, and controller 160 at one end of the fluid analysis system 50. There is a wide variety of networking architectures for multiplexing optical computing systems 501, and the choice of network architecture may depend on the selection of fiber sensors 500 to be used. For example, coupler 540 may include a wavelength division multiplexer (WDM) to receive multiple wavelengths in detector 130. As shown in FIG. 5, fiber sensors 500 at each optical sensing device 501 can use FBGs providing reflection lights 547a, 547b, and 547c at different center wavelengths. By processing the wavelength shift at each resonance wavelength, processor 161 determines a signal corresponding to each optical computing device 501. With this multiplexing capability, fluid analysis system 50 has the potential to analyze and identify multiple samples simultaneously, substantially improving measurement efficiency.

Figure 6:
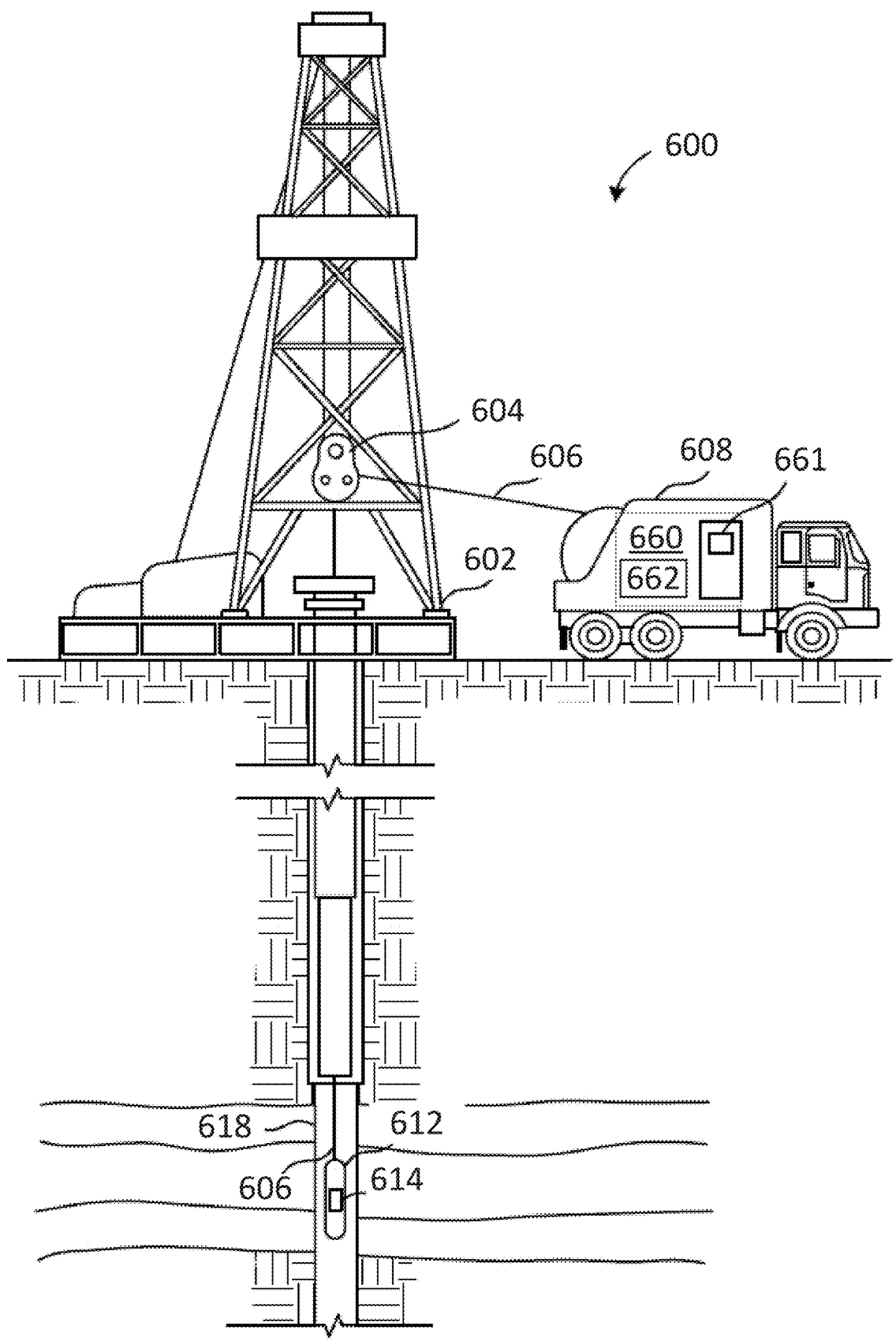
FIG. 6 illustrates a wireline system that remotely measures a characteristic of a sample during formation testing and sampling over an optical link.

FIG. 6 illustrates a wireline system 600 configured to measure remotely a characteristic of a sample during formation testing and sampling over an optical link. In some embodiments, wireline system 600 includes an optical computing device using ICE technology and FBG radiometry as disclosed herein for a remote measurement of a characteristic of a sample during formation testing and sampling. After drilling of wellbore 618 is complete, it may be desirable to know more details of types of formation fluids and the associated characteristics through sampling with use of a wireline formation tester. System 600 may include a wireline logging tool 612 that forms part of a wireline logging operation including one or more optical computing devices 614 as described herein (e.g., optical computing devices 101 and 501 of FIGS. 1 and 5).

System 600 may include a derrick 602 supporting a traveling block 604. Wireline logging tool 612, such as a probe or sonde, may be lowered by wireline or logging cable 606 into wellbore 618. Tool 612 may be lowered to the bottom of the region of interest and subsequently pulled upward at a substantially constant speed by wireline or logging cable 606. Tool 612 may be configured to measure fluid properties of the wellbore fluids, and any measurement data generated by wireline logging tool 612 and its associated optical computing devices 614 can be communicated to a surface logging facility 608 for storage, processing, and/or analysis. Any one of optical computing devices 614 may include an ICE and a fiber sensor according to embodiments disclosed herein (e.g., ICEs 102 and 202, and fiber sensors 100 and 500, cf. FIGS. 1, 2 and 5). Logging facility 608 may be provided with controller 660 including a processor 661 and a memory 662, to receive and process data from optical computing devices 614. Controller 660 provides commands and other signals to optical computing devices 614 (e.g., a pulsating modulation control signal to an illumination source in an optical computing device). More generally, controller 660, processor 661, and memory 662 may be as described in detail above (e.g., controller 160, processor 161, and memory 162, respectively, cf. FIGS. 1 and 5).

Figure 7:
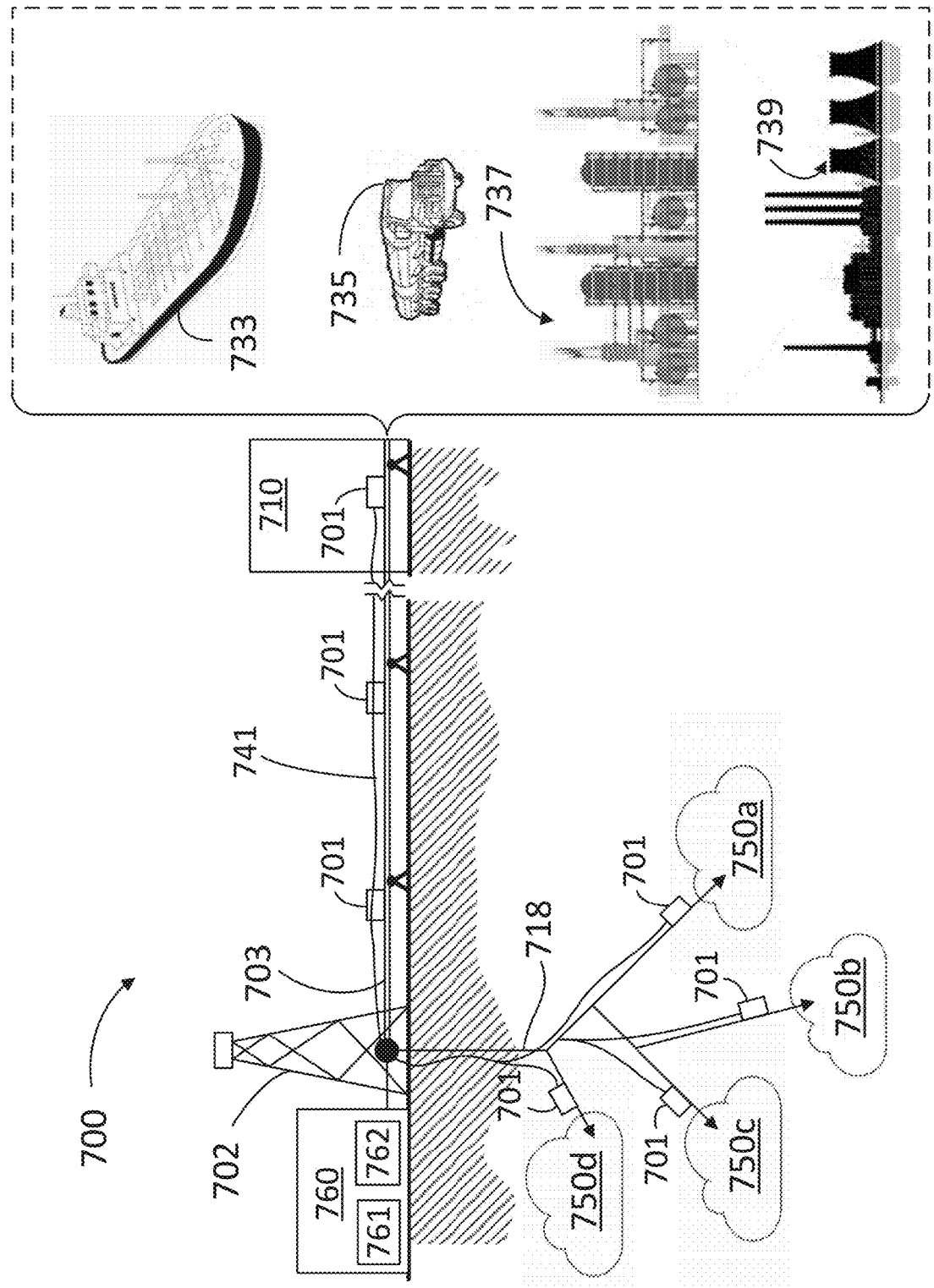
FIG. 7 illustrates a field deployment of a fluid analysis system including multiple fiber sensors coupled through an optical fiber link.

FIG. 7 illustrates a field deployment of a fluid analysis system 700 including multiple optical computing devices 701 coupled through an optical link 741. At least one of optical computing devices 701 includes a fiber sensor as disclosed herein (cf. fiber sensor 100, FIG. 1). In fluid analysis system 700 a derrick 702 provides support for hydrocarbon extraction and measurement equipment deployed through wellbore 718. At the surface, fluid analysis system 700 may include a controller 760 having a processor 761 and a memory 762. Controller 760, processor 761, and memory 762 may be as described in detail above (e.g., controllers 160 and 660, processors 161 and 661, and memories 162 and 662, respectively, cf. FIGS. 1 and 6). Wellbore 718 may be a subterranean wellbore or an undersea operation, in which case derrick 702, controller 760, and a portion of a pipeline 703 may be floating over the sea. The extracted hydrocarbon is transported through pipeline 703 to a delivery port 710, from which the hydrocarbon is transferred to a transportation vehicle (e.g., vessel 733 or truck 735), a refinery 737, or a power plant 739, among others.

Wellbore 718 may include a plurality of extraction reservoirs including hydrocarbon samples 750a, 750b, 750c, and 750d, as illustrative examples. In some embodiments, fluid analysis system 700 is deployed for long periods of time such as months, years, or even longer periods of time as allowed by the resiliency of optical fibers over harsh environmental conditions. Most of the electrical power consumption by fluid analysis system 700 takes place at the surface, in controller 760, where it is relatively easy to replace components, or provide an insulated environment that is more benign for high-end electronic circuitry in processor 761 and memory 762. Furthermore, the low power used at the downhole by optical computing devices 701 enables a permanent deployment of fluid analysis system 700. The use of fiber cable enables the extension of optical link 741 for hundreds of meters, and even kilometers (Km), such as ten (10) Km or even more.

Figure 8:
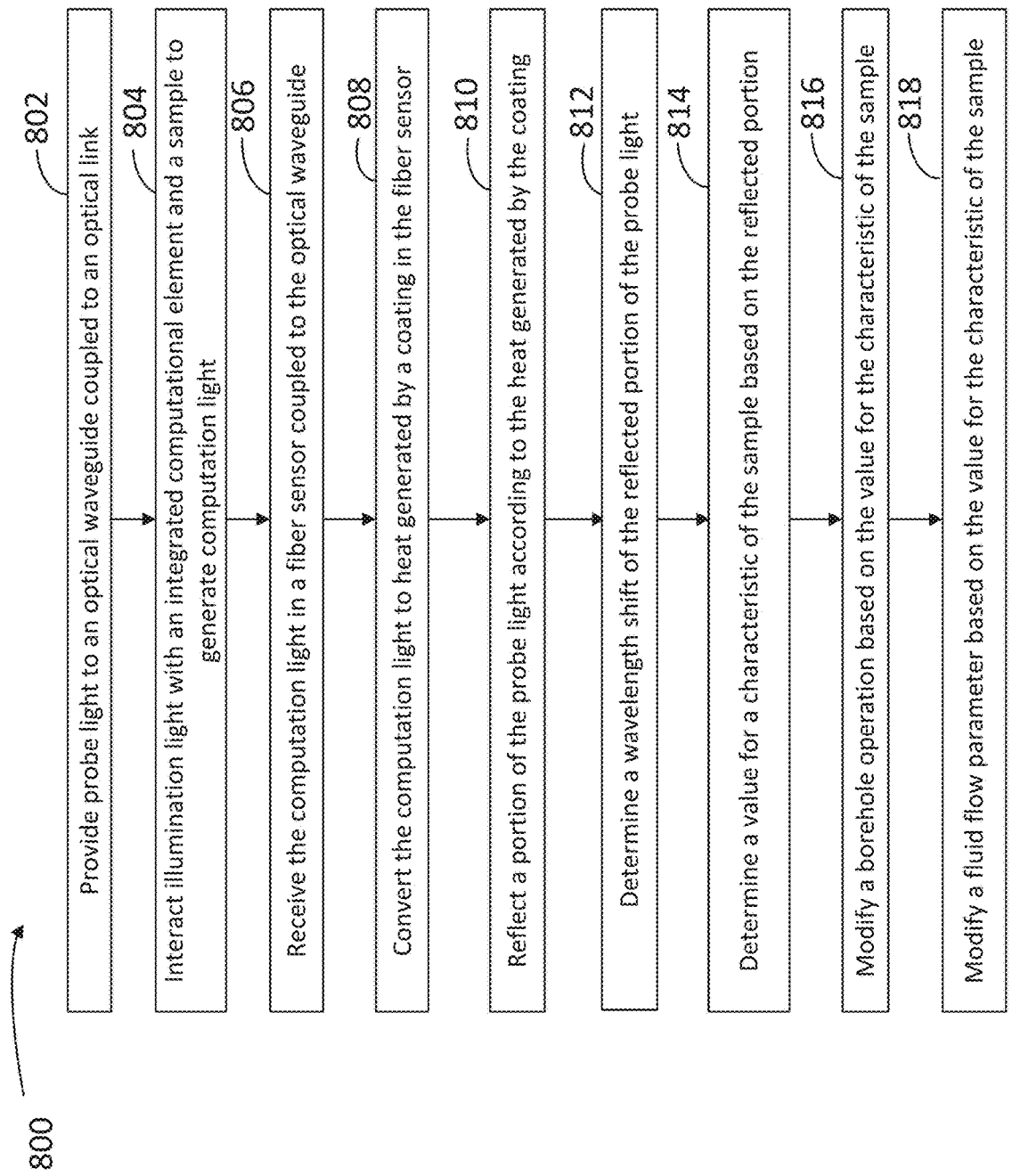
FIG. 8 illustrates a flow chart including steps in a method for remote measurement of a characteristic of a sample.

FIG. 8 illustrates a flow chart including steps in a method 800 for remote measurement of a characteristic of a sample. In some embodiments, steps in method 800 may be performed at least partially by a controller including a processor and a memory (e.g., controllers 160, 660, and 760, processors 161, 661, and 761, and memories 162, 662 and 762, cf. FIGS. 1, 6 and 7). The memory may store commands that, when executed by the processor, cause the controller to perform at least some of the steps in method 800. Accordingly, methods consistent with method 800 may be performed in connection with a system including an optical link having a coupler, an optical computing device including an ICE, and a fiber sensor (e.g., optical link 141, coupler 140, optical computing device 101, ICE 102, and fiber sensor 100, cf. FIG. 1). Moreover, methods consistent with method 800 may include using a probe light source in a telecommunications wavelength band, a detector, an optical waveguide such as an optical fiber, and a light source to provide an illumination light for the optical computing device (e.g., probe light source 120, detector 130, and light sources 110 and 510, cf. FIGS. 1 and 5).

Methods consistent with method 800 may include fewer steps than illustrated in FIG. 8 or other steps in addition to at least one of the steps in method 800. Moreover, methods consistent with the present disclosure may include at least one or more of the steps in method 800 performed in a different sequence. For example, some embodiments consistent with the present disclosure may include at least two steps in method 800 performed overlapping in time, or substantially simultaneously in time.

Step 802 includes providing probe light to an optical waveguide coupled to an optical link. In some embodiments, step 802 includes providing a plurality of transmission light pulses, each transmission light pulse transmitted at a pre-determined time from an optical source. Accordingly, step 802 may include selecting the pre-determined time according to a travel distance of the plurality of transmission light pulses and the location of the optical computing device within a plurality of optical computing devices disposed along the optical link. In some embodiments, step 802 includes providing a first transmission light at a first wavelength and a second transmission light at a second wavelength, and selecting the first wavelength and the second wavelength within a telecommunications wavelength band.

Step 804 includes optically interacting an illumination light with an integrated computational element and a sample to generate a computation light. Step 806 includes receiving the computation light in a fiber sensor coupled to the optical waveguide, the computation light being associated with a characteristic of the sample. In some embodiments, the computation light has an intensity that is proportional to the characteristic of a sample. Step 808 includes converting the computation light to heat from the absorption of the computation light by a coating on the fiber sensor.

Step 810 includes reflecting a portion of probe light affected by the heat generated in the coating. In some embodiments, step 810 includes reflecting a second portion of the probe light at a wavelength according to an environmental condition of the fiber sensor. Step 812 includes determining a wavelength shift of the reflected portion of the probe light.

Step 814 includes determining a value for the characteristic of the sample based on the reflected portion of the probe light. Accordingly, in some embodiments step 814 includes determining the value for the characteristic of the sample based on the wavelength shift of the reflected portion of the probe light. For example, step 814 may include finding the value for the characteristic of the sample in a table associating the wavelength shift of the reflected portion of the probe light with the value of the characteristic of the sample. In some embodiments, step 814 includes comparing a wavelength shift of the reflected portion in the presence of the computation light with the wavelength shift of the reflected portion in the absence of the computation light.

Step 816 includes modifying a wellbore operation based on the value for the characteristic of the sample. In some embodiments, step 816 may include injecting an additive into the wellbore to modify a composition of the hydrocarbon fluid extracted from the wellbore. Step 816 may include separating a water content from the hydrocarbon fluid extracted from the wellbore. Further, in some embodiments step 816 may include avoiding a bubble formation in a hydrocarbon fluid when a dissolved methane content reaches a threshold level. For example, step 816 may include injecting a coolant to lower the temperature of the hydrocarbon fluid, or reducing a pumping rate of the hydrocarbon fluid when a methane concentration is higher than a threshold.

Step 818 includes modifying a fluid flow parameter based on the value for the characteristic of the sample. In some embodiments, step 818 may include injecting an additive to the pipeline to modify the composition of a hydrocarbon fluid. For example, step 818 may include injecting an anti-bacterial substance in the pipeline when a bacterial content of the hydrocarbon fluid exceeds a certain threshold. In some embodiments, additive to remove or dissolve paraffins and other heavy hydrocarbons may be injected in to avoid forming of solid precipitates of wax in the pipeline when a concentration of a heavy hydrocarbon in the fluid exceeds a certain threshold. Step 818 may also include adjusting a fluid flow parameter such as a flow rate or a flow pressure, according to a methane content, a GOR, or a water content of a hydrocarbon fluid in the pipeline. Further, step 818 may include stopping or diverting the hydrocarbon flow when an octane level of the hydrocarbon is below or above a pre-determined threshold. Step 818 may also include diverting the hydrocarbon flow to a water separator according to a water content in the hydrocarbon fluid.

Those skilled in the art will readily appreciate that the methods described herein, or large portions thereof may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of I, II, and III" or "at least one of I, II, or III" each refer to only I, only II, or only III; any combination of I, II, and III; and/or at least one of each of I, II, and III.

Embodiments disclosed herein include:

A. A device including an integrated computational element (ICE), and a sample cell that optically interacts the ICE with a sample to generate computation light associated with a characteristic of the sample. The fiber sensor receives the computation light and converts the computation light into heat. In some embodiments, the fiber sensor is communicably coupled with a detector through an optical link and configured to return a portion of probe light through the optical link to the detector according to the heat converted.

B. A system, including a probe light source that generates and emits a probe light, a detector, and an optical link to transmit the probe light. In some embodiments, the system also includes an optical computing device having an integrated computational element (ICE), a sample cell that optically interacts the ICE with a sample to generate computation light associated with a characteristic of the sample, and a fiber sensor that converts the computation light into heat. In some embodiments, the fiber sensor is communicably coupled to the detector through the optical link, and is configured to return a portion of the probe light through the optical link to the detector according to the heat converted.

C. A method, including providing probe light to an optical waveguide communicably coupled to an optical link, optically interacting illumination light with an integrated computational element and a sample to generate computation light associated with a characteristic of a sample, and converting the computation light to heat generated by a coating disposed in a fiber sensor located along the optical link. In some embodiments, the method also includes reflecting, in the fiber sensor, a portion of the probe light according to the heat generated by the coating, and determining a value for the characteristic of the sample based on the reflected portion of the probe light.

Each of the embodiments A, B and C may have one or more of the following additional elements in any combination: Element 1, wherein an intensity of the computation light is proportional to the characteristic of the sample. Element 2, wherein the probe light is selected from one of a plurality of telecommunications wavelength bands. Element 3, wherein the ICE includes a plurality of alternating layers of two materials having different indices of refraction, each of the layers of material having a selected thickness so that an intensity of the computation light is proportional to the characteristic of the sample. Element 4, wherein the fiber sensor includes a fiber Bragg grating (FBG) that returns the portion of the probe light, and wherein the FBG includes a core that is thermally coupled to a sensitive coating that absorbs the computation light. Element 5, wherein the FBG is a first FBG and the fiber sensor includes a second FBG configured to return a second portion of the probe light based on an environmental condition of the fiber sensor. Element 6, wherein the sensitive coating absorbs the computation light and transmits the heat to the core. Element 7, wherein the sensitive coating includes a material that is an absorber in the near infrared (NIR) spectral domain. Element 8, wherein the returned portion of the probe light has a center wavelength related to the heat received by the sensitive coating. Element 9, wherein the ICE provides a modified light from an illumination source and the modified light optically interacts with the sample in the sample cell to generate the computation light. Element 10, wherein the ICE provides the computation light from the optical interaction of an illumination source with the sample in the sample cell.

Element 11, wherein the probe light source generates the probe light in a wavelength range included in at least one of a plurality of telecommunication bands. Element 12, wherein the probe light source is one of a continuous laser, a pulsed laser, a tunable laser, and a broadband light source. Element 13, further including a plurality of optical computing devices distributed in a network communicably coupled with each other via the optical link. Element 14, wherein the fiber sensor includes a sensitized fiber Bragg grating (FBG) that is thermally coupled with a sensitive coating that absorbs and converts the computation light into the heat.

Element 15, further including reflecting a second portion of the probe light at a wavelength according to an environmental condition of the fiber sensor. Element 16, further including determining a wavelength shift of the reflected portion of the probe light, wherein determining the value for the characteristic of the sample includes finding the value for the characteristic of the sample in a table associating the wavelength shift of the reflected portion of the probe light with the value of the characteristic of the sample. Element 17, wherein determining the value for the characteristic of the sample based on the reflected portion includes comparing a wavelength shift of the reflected portion in the presence of the illumination light with the wavelength shift of the reflected portion in the absence of the illumination light. Element 18, further including modifying a wellbore operation based on the value for the characteristic of the sample. Element 19, further including modifying a fluid flow parameter based on the value for the characteristic of the sample. Element 20, wherein reflecting in the fiber sensor a portion of the probe light includes reflecting a portion of the probe light from a long period grating formed along the optical link. Element 21, wherein reflecting in the fiber sensor a portion of the probe light includes reflecting a portion of the probe light from an extrinsic Fabry-Pérot interferometer optically coupled to the optical link. Element 22, wherein determining a value for the characteristic of the sample includes measuring a change in a property of the reflected portion of the probe light selected from the group consisting of a power, a phase, and a state of polarization.

The invention claimed is:

1. A device, comprising:
   an integrated computational element (ICE);
   a sample cell that optically interacts the ICE with a sample to generate computation light associated with a characteristic of the sample; and
   a fiber sensor that receives the computation light and converts the computation light into heat, the fiber sensor being communicably coupled with a detector through an optical link and configured to return a portion of probe light through the optical link to the detector according to the heat converted.

2. The device of claim 1, wherein an intensity of the computation light is proportional to the characteristic of the sample.

3. The device of claim 1, wherein the probe light is selected from one of a plurality of telecommunications wavelength bands.

4. The device of claim 1, wherein the ICE includes a plurality of alternating layers of two materials having different indices of refraction, each of the layers of material having a selected thickness so that an intensity of the computation light is proportional to the characteristic of the sample.

5. The device of claim 1, wherein the fiber sensor includes a fiber Bragg grating (FBG) that returns the portion of the probe light, and wherein the FBG includes a core that is thermally coupled to a sensitive coating that absorbs the computation light.

6. The device of claim 5, wherein the FBG is a first FBG and the fiber sensor includes a second FBG configured to return a second portion of the probe light based on an environmental condition of the fiber sensor.

7. The device of claim 5, wherein the sensitive coating absorbs the computation light and transmits the heat to the core.

8. The device of claim 5, wherein the sensitive coating comprises a material that is an absorber in a near infrared (NIR) spectral domain.

9. The device of claim 5, wherein the returned portion of the probe light has a center wavelength related to the heat received by the sensitive coating.

10. The device of claim 1, wherein the ICE provides a modified light from an illumination source and the modified light optically interacts with the sample in the sample cell to generate the computation light.

11. The device of claim 1, wherein the ICE provides the computation light from the optical interaction of an illumination source with the sample in the sample cell.

12. A system, comprising:
    a probe light source that generates and emits a probe light;
    a detector;
    an optical link to transmit the probe light; and
    an optical computing device, comprising:
       an integrated computational element (ICE);
       a sample cell that optically interacts the ICE with a sample to generate computation light associated with a characteristic of the sample; and
       a fiber sensor that converts the computation light into heat, the fiber sensor being communicably coupled to the detector through the optical link and configured to return a portion of the probe light through the optical link to the detector according to the heat converted.

13. The system of claim 12, wherein the probe light source generates the probe light in a wavelength range included in at least one of a plurality of telecommunication bands.

14. The system of claim 12, wherein the probe light source is one of a continuous laser, a pulsed laser, a tunable laser, and a broadband light source.

15. The system of claim 12, further comprising a plurality of optical computing devices distributed in a network communicably coupled with each other via the optical link.

16. The system of claim 12, wherein the fiber sensor comprises a sensitized fiber Bragg grating (FBG) that is thermally coupled with a sensitive coating that absorbs and converts the computation light into the heat.

17. A method, comprising:
    providing probe light to an optical waveguide communicably coupled to an optical link;
    optically interacting illumination light with an integrated computational element and a sample to generate computation light associated with a characteristic of a sample;
    converting the computation light to heat generated by a coating disposed in a fiber sensor located along the optical link;
    reflecting, in the fiber sensor, a portion of the probe light according to the heat generated by the coating; and
    determining a value for the characteristic of the sample based on the reflected portion of the probe light.

18. The method of claim 17, further comprising reflecting a second portion of the probe light at a wavelength according to an environmental condition of the fiber sensor.

19. The method of claim 17, further comprising determining a wavelength shift of the reflected portion of the probe light, wherein determining the value for the characteristic of the sample includes finding the value for the characteristic of the sample in a table associating the wavelength shift of the reflected portion of the probe light with the value of the characteristic of the sample.

20. The method of claim 17, wherein determining the value for the characteristic of the sample based on the reflected portion comprises comparing a wavelength shift of the reflected portion in the presence of the illumination light with the wavelength shift of the reflected portion in the absence of the illumination light.

21. The method of claim 17, further comprising modifying a wellbore operation based on the value for the characteristic of the sample.

22. The method of claim 17, further comprising modifying a fluid flow parameter based on the value for the characteristic of the sample.

23. The method of claim 17, wherein reflecting in the fiber sensor a portion of the probe light comprises reflecting a portion of the probe light from a long period grating formed along the optical link.

24. The method of claim 17, wherein reflecting in the fiber sensor a portion of the probe light comprises reflecting a portion of the probe light from an extrinsic Fabry-Pérot interferometer optically coupled to the optical link.

25. The method of claim 17, wherein determining a value for the characteristic of the sample comprises measuring a change in a property of the reflected portion of the probe light selected from the group consisting of a power, a phase, and a state of polarization.

* * * * *